United States Patent

[11] 3,617,683

[72] Inventors Michael Patrick Beresford
Gloucester;
Brian Frederick Scott, Birmingham, both of England
[21] Appl. No. 2,505
[22] Filed Jan. 13, 1970
[45] Patented Nov. 2, 1971
[73] Assignees The Universtiy of Birmingham
Birmingham, England;
Spacratron Limited
Tuffley Crescent, Gloucester, England
[32] Priority Jan. 14, 1969
[33] Great Britain
[31] 2191/69

[54] METHOD AND APPARATUS FOR WORKING MATERIAL USING LASER BEAMS
8 Claims, 5 Drawing Figs.

[52] U.S. Cl. .................................................. 219/121 L
[51] Int. Cl. .................................................. B23k 9/00
[50] Field of Search .................................... 219/121 L, 121 EB, 85

[56] References Cited
UNITED STATES PATENTS
3,334,213   8/1967   Sauve et al. ................. 219/121 EB

*Primary Examiner*—J. V. Truhe
*Assistant Examiner*—Lawrence A. Rouse
*Attorney*—Shoemaker and Mattare

ABSTRACT: The invention relates to methods and apparatus for working materials using laser beams. The workpiece is laid on support means which include table beneath which is located a laser beam emitter and an associated optical system for focusing the laser beam. The support means, which include the worktable, has a generally vertical through hole and the workpiece is laid over this hole. The laser optical system is arranged to direct the beam from below through the hole in the support means and to focus the beam at the level of the upper end of the hole, that is, substantially on the underside of the workpiece. Means are provided above the worktable for indicating the position of the optical axis of the laser beam. Means are provided for shrouding the laser beam to prevent stray emission.

PATENTED NOV 2 1971 3,617,683

INVENTORS
MICHAEL PATRICK BERESFORD
BY
BRIAN FREDERICK SCOTT
Shoemaker and Mattare
ATTORNEYS INVENTORS
MICHAEL PATRICK BERESFORD
BRYAN FREDERICK SCOTT
BY
Shoemaker and Mattare
ATTORNEYS

METHOD AND APPARATUS FOR WORKING MATERIAL USING LASER BEAMS

This invention relates to methods and apparatus for working materials using laser beams.

Machining processes employing laser (light amplification by stimulated emission of radiation) have recently come into increasing utilization and are particularly advantageous where conventional drilling presents difficulties. An example is the forming of very small holes in ceramic substrates for microelectronic components in integrated circuits. However, this is but one of many uses of laser in machine tools.

When using laser as the energy source for working materials, it is necessary to avoid possible injury to the operator or to any person who may be in the vicinity of the system. The rays of visible and at times invisible light generated by a laser as electromagnetic radiation can have extremely high power outputs, and can cause serious damage to the eyes and/or skin. When the output energy is further concentrated, as by an optical system, the power intensity (power per unit area) increases further and so increases the potential risk to humans.

Although various recommendations have been published which suggest certain safe values of energy density, and pulse values, it is considered that in any materials working system utilizing laser, the output will exceed the recommended safe values. This means that the potentially dangerous beam must be shrouded from the operator and any other person. A means by which to achieve this object will be described in this specification.

For the purposes of this specification, the beam that leaves the laser optical system and impinges upon the workpiece will be referred to as the primary beam. The reflected beam, i.e. from the workpiece to any other object will be referred to as the secondary beam.

A means will be described which gives the facility for simplifying focusing arrangements in the laser system. To achieve predictable results when materials working using a laser system, it is necessary to know the power intensity (power per unit area) of the output incident upon the workpiece. It is usually required to focus the output beam on, or very close to the surface of the workpiece. This infers that for different thicknesses of workpiece, the laser optical system must be refocused, or that the workpiece must be moved with respect to the focal plane.

FIG. 1 of the accompanying drawings shows a commonly used layout for a laser materials working system. Here the workpiece 1 is disposed between the laser optical system generally designated 2 and a table 3. The difficulties of shrouding the primary and secondary beams and positioning the workpiece accurately with respect to the beam center line are overcome, for example, by enclosing the workpiece and providing remote manipulation.

The laser beam requires to be focused at a known point relative to the point of entry to the workpiece and one disadvantage of conventional systems is the need to refocus the laser optical system after a new workpiece has replaced a previous one having a different thickness. The correct positioning of the workpiece relative to the laser beam center line has also proved difficult especially when a succession of differently shaped workpieces are involved, since the operator is not able to see the working area until the laser has been fired. Such difficulties of conventional systems can to a limited extent be overcome by the provision of expensive and complex remote viewing equipment.

Broadly stated the present invention provides a method of working materials utilizing a laser beam which comprises laying the workpiece on support means and directing the laser beam from below upwardly through a hole in the support means against the underside of the workpiece and focusing the laser beam at the level of the upper end of the hole in the support means.

This procedure provides the advantage that as the level of the upper end of the hole in the support means can be accurately determined a laser beam prefocused at this level, will be correctly focused for workpieces of various thickness laid over the hole in the support means. An equally important practical advantage is that the support means may be employed to shroud the laser beam to prevent stray emission.

Moreover, in conjunction with other means described below, there is obtained apparatus which, during its operation, presents little or no danger to persons supervising the process.

One apparatus according to the present invention for working materials using laser beams comprises support means in the form of a worktable having an aperture, there being beneath said worktable and shrouded at least in part thereby, a laser beam emitter and an optical system adapted to direct the primary beam upwardly through said aperture and to focus said beam substantially at the level of the top of the aperture in the worktable so as to be correctly focused on the underside of a workpiece laid on the table over said aperture, irrespective of the thickness of the workpiece.

According to a further preferred aspect of the invention for centering the workpiece there is provided above the table a probe arranged to be movable along the axis of the laser beam and which probe can be lowered on to the workpiece to indicate on the upper side thereof the position of the axis.

Preferably the probe is arranged so that if it is further lowered in the absence of a workpiece, it closes said aperture, and acts as a further safeguard in the event of inadvertent emission of the laser beam.

A shutter may be provided which normally closes the aperture in the worktable, but which is mechanically or electrically coupled with the probe, whereby the shutter is automatically removed when the probe is lowered into contact with the workpiece.

Coupled with the probe operation there may be provided safety switch means which are effective to prevent laser beam emission except when the probe is lowered into contact with a workpiece or to close said aperture.

In practice, a tooling template will be located above the workpiece and this will have indicator means by which it can be readily and correctly aligned with the probe.

In a further alternative arrangement, the workpiece is located between a template and a backing plate having a plurality of holes in register with those of the template. As the backing plate is laid on the table the laser optical system will be adjusted to focus the beam at the level of the upper surface of the backing plate.

Various embodiments of the invention are illustrated diagrammatically in FIGS. 2 to 5 of the accompanying drawings in which, FIG. 2 shows the relative dispositions of a laser emitter, a laser optical system, a worktable and a workpiece in one method of operation according to the invention;

Figure 1:
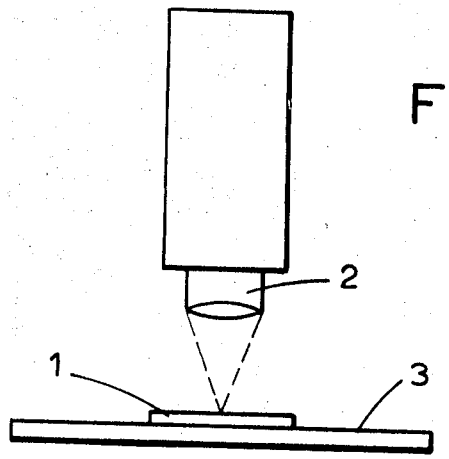
Figure 2:
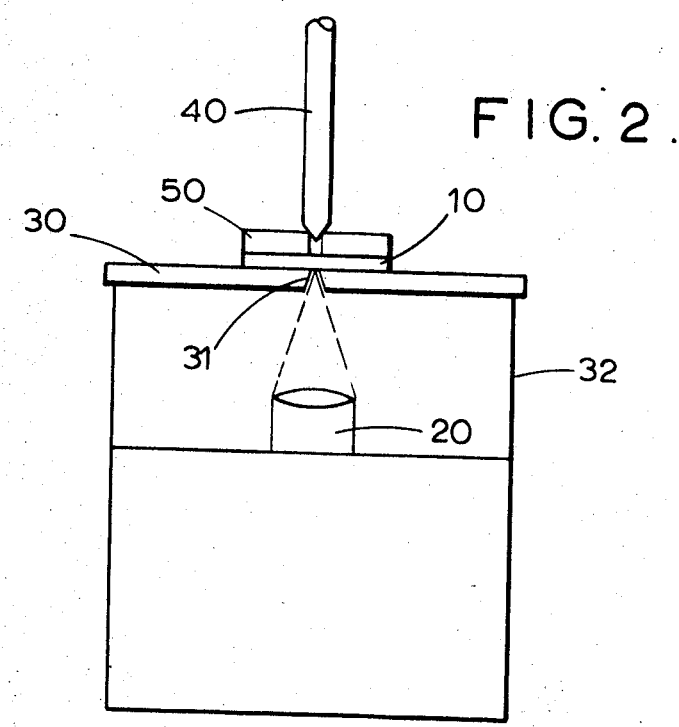

Referring first to FIG. 2, 10 represents a workpiece, for example a ceramic substrate for microelectronic components, which require to have a through hole formed in it using a laser beam.

According to the invention, the laser emitter and its optical system generally designated 20 are located beneath a worktable 30 and the optical system 20 is arranged to direct the beam through a hole 31 formed in the worktable 30.

The worktable 30 partially shrouds the beam, and shrouding is continued by shielding walls 32 laterally enclosing the emitter and the optical system 20.

When, as shown in FIG. 2, the workpiece 10 is laid directly on the table 30, the optical system can be adjusted to prefocus the laser beam at the level of the upper end of the hole 31, that is at the level of the upper surface of the table 30. The beam will then be correctly focused for workpieces of different thicknesses laid on the table 30 over the hole 31.

To indicate the axis of the laser beam and hence to assist in correct location of the workpiece 10, a probe 40 will be provided movable towards or away from the hole 31 along the axis of the beam. In conjunction with the probe a template 50 may be provided carrying the workpiece at its underside. The workpiece 10 may then be located by registering the probe 40 with a hole 51 in the template 50.

Figures 3, 5:
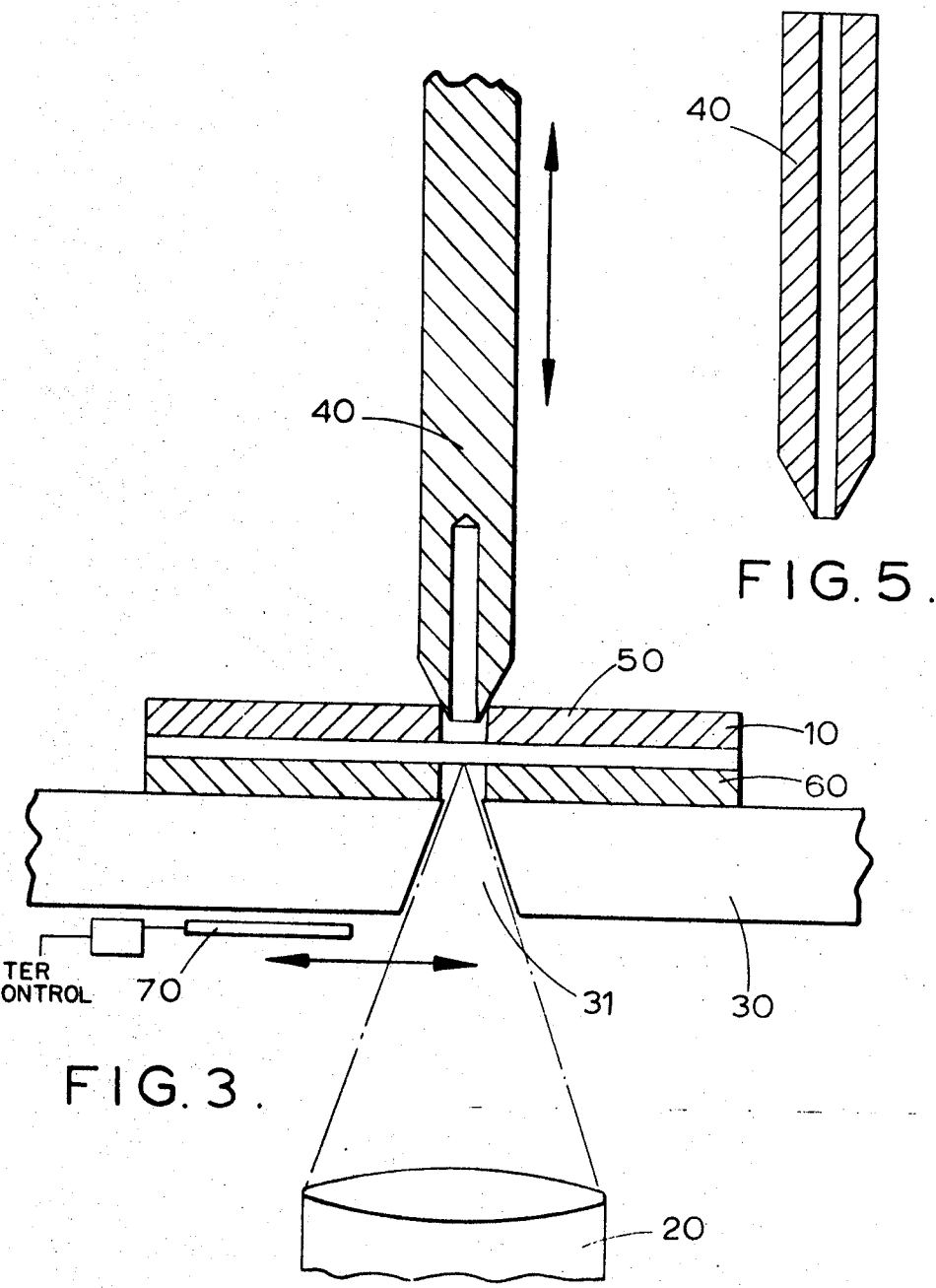
FIG. 3 illustrates a modified method of operation in which the workpiece is located between a template and a backing plate shown also in perspective view in FIG. 4.
FIG. 5 illustrates a locating probe which may be employed with the apparatus of FIGS. 2 or 3.
Figure 4:
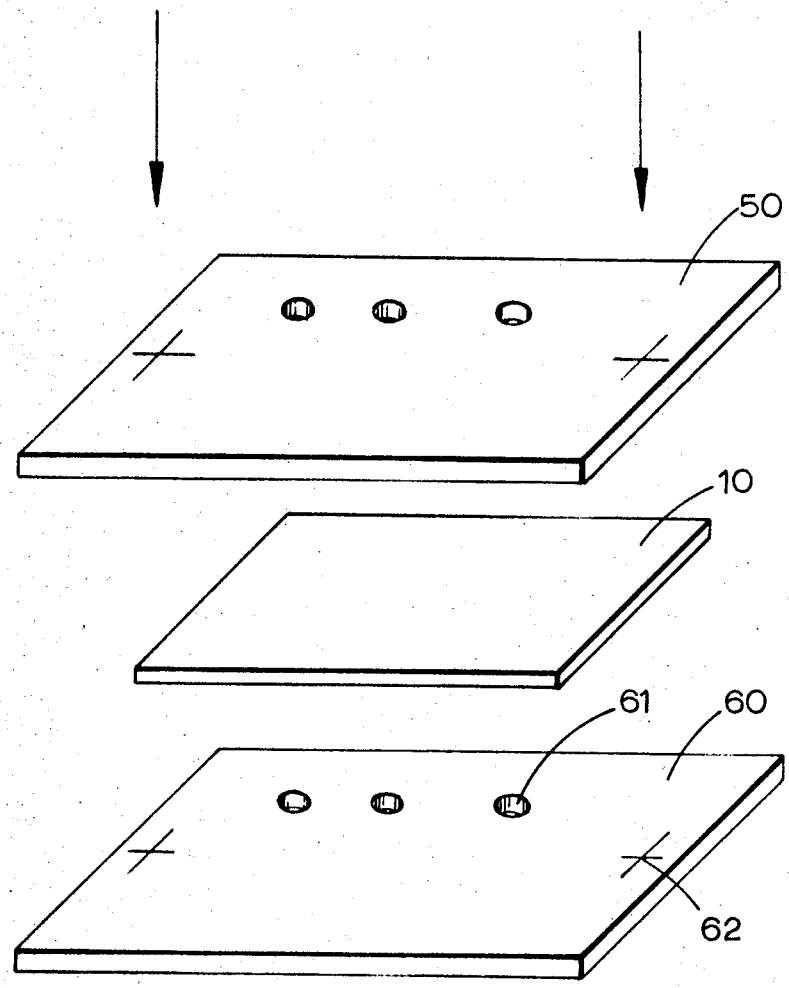

Alternatively and as shown in FIGS. 3 and 4, the workpiece 10 may be sandwiched between a template 50 and a baseplate 60, the latter having one or more holes 61 for registering with the hole 31 in the worktable 30. As shown the baseplate 60 has three such holes and by providing three corresponding holes in the template 50, the probe may be employed to register the workpiece so that three holes may be accurately formed therein by appropriate repositioning of the sandwich over the hole 31. The template 50 and baseplate 60 will be formed with appropriate keying means at locations designated 62.

The probe may as shown in FIGS. 2 and 3, be a simple rod with a pointed or frustoconical lower end for registering with the template. Alternatively as shown in FIG. 5 the probe 40 may have a hollow bore so as to permit a drill or reamer to be passed down its bore in order to enlarge a hole formed by the laser beam.

The probe 40 constitutes a useful safety device in that when it bears on the hole in the template 50 it prevents stray emission of the laser beam, even if the beam has penetrated through the workpiece. Accordingly, means are preferably provided for preventing the laser emitter from operating except when the probe is bearing either on the hole 51 or on the hole 31. These means will comprise simple mechanical or electrical interlocks of a form well known in the art of machine tools.

Such simple mechanical or electrical interlocks may also be employed to control a shutter 70 shown in FIG. 3 and arranged to mask the hole 31 in the worktable 30. The shutter 70 will be arranged to unmask the hole 31 only when the probe encounters resistance on being moved downwardly.

The following objectives can, therefore, be achieved in accordance with this invention:

1. By reference to FIGS. 2 and 3 it can be seen that the primary and secondary beams are completely contained irrespective of material thickness. The probe and the shutter can be provided with simple mechanical and/or electrical interlocks to isolate the laser if the system is not sealed by workpiece and correctly positioned probe.

2. The working plate remains constant irrespective of material thickness and so avoids the need for repositioning the focal plane when working different material thicknesses.

3. The need for remote viewing, illumination and focusing is avoided.

4. The probe provides a means of accurately positioning the workpiece relative to the laser beam centerline. Simple tooling techniques can be used to achieve specified patterns of material working. One example is shown in FIG. 3.

5. Operations subsequent to the laser beam operation may be achieved by allowing, i.e., a drill broach or reamer to pass through the probe and into the workpiece without repositioning the workpiece.

We claim:

1. A method of working materials utilizing a laser beam which comprises laying the workpiece on support means and directing the laser from below upwardly through a hole in the support means against the underside of the workpiece and focusing the laser beam at the level of the upper end of the hole in the support means, and including the step of assembling the workpiece beneath a template and utilizing indicator means located above the support means to locate the template in desired position relative to the optical axis of the laser beam, said template having a through hole, and said indicator means including a probe located above the support means and movable along the optical axis of the laser beam into a position when it is in contact with the template and at least partially obturates the hole in the template, and there being means for preventing emission of said laser beam except when said probe is in predetermined position.

2. A method according to claim 1, wherein, emission of said laser beam is permitted only when said probe is in position at least partially obturating said hole in said template.

3. Apparatus for working materials utilizing a laser beam comprising support means having a generally vertical hole through said support means terminating at the upper surface thereof, a laser beam emitter and optical system located below said support means and arranged to project a laser beam upwardly through said hole and to focus the said beam at the level of the termination of the hole at the upper surface of the support means, a probe located above the support means and movable along the optical axis of the laser beam, the probe having at its lower end means for showing the location of said optical axis, and means for preventing emission of said laser beam except when said probe is in predetermined position relative to said hole.

4. Apparatus according to claim 3, wherein said probe is a rod having a hollow axial through bore.

5. Apparatus according to claim 4 including a shutter means arranged to mask the underside of the hole in the support means.

6. Apparatus according to claim 4 including shielding walls surrounding said laser emitter and optical system and with said support means constituting a shroud preventing stray emission from said laser beam.

7. Apparatus for working material utilizing a laser beam comprising a worktable with a generally horizontal upper surface, a substantially vertical hole through said worktable terminating at the upper surface thereof, a laser beam emitter and an optical system located below the worktable and adapted to direct a primary laser beam upwardly through said hole, a backing plate laid on said table, a template secured to said backing plate and spaced vertically therefrom, the space between the backing plate and the template being adapted to be occupied by a workpiece, at least one through hole in said backing plate registering with a through hole in the template and with the hole in the worktable, a probe located above said template and movable along the optical axis of the laser beam into a position when it is in contact with the template and at least partially obturates the through hole therein, and means for preventing emission of said laser beam except when said probe is in predetermined position.

8. Apparatus according to claim 7 wherein emission of said laser beam is permitted only when said probe is in position at least partially obturating said hole in said template.

* * * * *